US009540951B2

(12) United States Patent
Dos Santos et al.

(10) Patent No.: US 9,540,951 B2
(45) Date of Patent: Jan. 10, 2017

(54) SYSTEM FOR PRESSURING THE BEARING CHAMBERS OF TURBINE ENGINES MACHINES USING AIR TAKEN FROM THE INTAKE DUCT

(75) Inventors: Nelson Dos Santos, Creteil (FR); Dominik Igel, Hericy (FR); Serge Rene Morreale, Guignes (FR)

(73) Assignee: SNECMA, Paris (FR)

( * ) Notice: Subject to any disclaimer, the term of this patent is extended or adjusted under 35 U.S.C. 154(b) by 769 days.

(21) Appl. No.: 13/823,179

(22) PCT Filed: Sep. 22, 2011

(86) PCT No.: PCT/FR2011/052197
§ 371 (c)(1),
(2), (4) Date: Mar. 14, 2013

(87) PCT Pub. No.: WO2012/038667
PCT Pub. Date: Mar. 29, 2012

(65) Prior Publication Data
US 2013/0177398 A1    Jul. 11, 2013

(30) Foreign Application Priority Data

Sep. 23, 2010 (FR) ...................................... 10 57642

(51) Int. Cl.
*F01D 25/20* (2006.01)
*F01D 25/18* (2006.01)
(Continued)

(52) U.S. Cl.
CPC ............... *F01D 25/20* (2013.01); *F01D 11/04* (2013.01); *F01D 25/125* (2013.01);
(Continued)

(58) Field of Classification Search
CPC ...... F01D 25/18; F01D 25/125; F01D 25/162; F01D 25/183; F01D 25/20; F01D 11/04; F01D 25/22; F02C 7/185; F05D 2240/50; F05D 2220/32; F05D 2210/13; F05D 2210/132; F05D 2260/98; F16N 2210/02; F16N 7/40
See application file for complete search history.

(56) References Cited

U.S. PATENT DOCUMENTS 3,722,624 A * 3/1973 Buckland .............. F01D 25/183
184/6.11
5,076,765 A * 12/1991 Yagi ...................... F01D 25/183
277/366
(Continued)

FOREIGN PATENT DOCUMENTS

EP    1 905 962    4/2008
EP    1 933 077    6/2008
(Continued)

OTHER PUBLICATIONS

International Search Report Issued Nov. 15, 2011 in PCT/FR11/52197 Filed Sep. 22, 2011.

*Primary Examiner* — Bryan Lettman
*Assistant Examiner* — Timothy Solak
(74) *Attorney, Agent, or Firm* — Oblon, McClelland, Maier & Neustadt, L.L.P.

(57) ABSTRACT

A system for pressurizing at least one chamber for lubricating bearings of a turbine engine, including a circuit for supplying the chamber with pressurized air, and a circuit for recovering oil mist formed in the chamber and for returning the mist to an oil tank of the turbine engine. The supply circuit supplies the chamber with air taken upstream from the low-pressure compressor.

12 Claims, 2 Drawing Sheets

(51) Int. Cl.
  *F01D 25/12* (2006.01)
  *F02C 7/18* (2006.01)
  *F01D 11/04* (2006.01)
  *F01D 25/16* (2006.01)
  *F01D 25/22* (2006.01)

(52) U.S. Cl.
  CPC ........... *F01D 25/162* (2013.01); *F01D 25/18* (2013.01); *F01D 25/183* (2013.01); *F01D 25/22* (2013.01); *F02C 7/185* (2013.01); *F05D 2210/13* (2013.01); *F05D 2220/32* (2013.01); *F05D 2240/50* (2013.01); *Y02T 50/675* (2013.01)

(56) References Cited

U.S. PATENT DOCUMENTS

| | | | | |
|---|---|---|---|---|
| 5,144,794 | A * | 9/1992 | Kirikami | F01D 5/081 415/115 |
| 6,470,666 | B1 * | 10/2002 | Przytulski | F01D 25/125 184/6.11 |
| 7,584,619 | B2 * | 9/2009 | Granitz | F01D 25/20 184/6.4 |
| 2005/0211093 | A1 | 9/2005 | Latulipe et al. | |
| 2005/0217272 | A1 * | 10/2005 | Sheridan | B01D 45/14 60/772 |
| 2006/0248865 | A1 | 11/2006 | Latulipe et al. | |
| 2007/0193276 | A1 * | 8/2007 | Corattiyil | F02C 7/06 60/782 |
| 2008/0072755 | A1 | 3/2008 | Dooley | |
| 2009/0101444 | A1 * | 4/2009 | Alecu | F01D 25/18 184/11.2 |
| 2009/0103843 | A1 | 4/2009 | Maguire | |
| 2009/0103849 | A1 | 4/2009 | Maguire | |
| 2010/0028127 | A1 | 2/2010 | Cornet et al. | |

FOREIGN PATENT DOCUMENTS

| | | |
|---|---|---|
| EP | 2 050 932 | 4/2009 |
| GB | 695 482 | 8/1953 |

* cited by examiner

SYSTEM FOR PRESSURING THE BEARING CHAMBERS OF TURBINE ENGINES MACHINES USING AIR TAKEN FROM THE INTAKE DUCT

BACKGROUND OF INVENTION

Field of Invention

The present invention relates to the field of aerospace turbomachines and, more particularly, that of pressurizing the internal chambers of such turbomachines.

Description of Related Art

Modern turbomachines generally take the form of an assembly of modules comprising either moving parts or stationary parts. Starting from the upstream end, they first of all comprise one or more compressor modules, arranged in series, which compress air sucked into an air intake. The air is then passed into a combustion chamber where it is mixed with fuel and burned. The combustion gases pass through one or more turbine modules which drive the one or more compressors. The gases are finally ejected either through a nozzle to provide a propulsive force or through a free turbine to provide power on a transmission shaft.

The rotating parts, such as the one or more rotating shafts, the one or more compressors and the one or more turbines, are carried by structural parts by means of bearings which are enclosed in chambers allowing the bearings to be lubricated and cooled. Turbomachines generally comprise two lubrication chambers, one located in the forward region which encloses the compressor-side bearings and one located in the rear region which encloses the turbine-side bearings. These chambers consist of a collection of moving and stationary walls, between which are arranged labyrinth-type devices in order to ensure the necessary sealing therebetween.

The stationary part of the forward chamber is made up of elements of a structural part termed the intermediate frame, while the rear chamber is made up of elements of a second structural part termed the exhaust frame. Examples of such chambers are represented in FIGS. 1 and 2. These structural parts support the bearings which in turn support the moving parts of the turbomachine.

In order to ensure that the oil is maintained inside the lubrication chambers, these are generally kept at a higher pressure than the surrounding spaces. To this end, pressurized air is injected into these chambers through orifices designed for this purpose. At the outlet of the chamber, an air/oil mixture is collected, the constituents of which are then separated by an oil separator-type device so that the oil can be sent to the ad hoc reservoir and the pressurization air can be vented to the outside.

In the prior art, the air for pressurizing the chambers is bled from downstream of a compressor stage, generally downstream of the low-pressure (LP) compressor. In existing engines, this pressure is sufficiently high to achieve the desired overpressure, without the air bled therefrom being at too high a temperature. In modern engines, where compression ratios in the compressors are ever higher, the temperature of the air leaving the LP compressor is relatively high. It follows that the temperature of the air entering the second chamber is too high, due to the heat energy imparted to it during its passage through the engine, this path taking it alongside the hot parts of the engine. It would then not be able to carry out its task of cooling the oil of the chamber, the temperature of which could then exceed 200° C. in certain working phases, which is not within acceptable limits.

One possible solution might be to bleed air further upstream than the exit from the LP compressor, but the pressure of the air bled would then not be high enough, especially at low engine speeds and when running on the ground, to adequately supply the chambers. There would then be the risk of inadequate air flow rate, or even of the air for cooling the chambers reversing its flow direction.

Another solution might be to fit an additional heat exchanger of the air/oil or air/fuel type and/or a return line for returning the fuel to the tank in order to increase the oil flow rate, and thus its cooling potential, at low engine speeds. However, such solutions are complicated to implement and give rise to additional weight.

BRIEF SUMMARY OF INVENTION

The aim of the present invention is to solve these drawbacks by proposing a system for pressurizing the air for cooling the chambers for lubricating the bearings of modern turbomachines, said system not having some of the drawbacks of the prior art and, in particular, ensuring effective circulation of the air for conditioning the chambers under all operating conditions of the turbomachine.

To this end, the invention relates to a system for pressurizing at least one chamber for lubricating the bearings of a turbomachine, comprising a circuit for supplying said chamber with pressurized air, and a circuit for recovering the oil mist formed in the chamber and for returning this mist to the oil reservoir of the turbomachine. It is characterized in that the supply circuit supplies said chamber with air bled from upstream of the low-pressure compressor. Choosing suction by air bled from upstream of the LP compressor, i.e. directly from the air intake of the engine, makes it possible to work with the coldest possible air and thus to avoid the air having an already raised temperature before it is circulated in the chambers to be lubricated and cooled.

Preferably, the supply circuit is supplied both with air bled from upstream of the compressor and with air bled from downstream of a compressor stage, the latter air being returned to the pressure of the air bled from upstream of the compressor by being passed through a labyrinth.

This ensures an adequate flow rate for cooling the chambers. The air bled from downstream of a compressor is returned to the pressure of the air from the air intake by passing it through labyrinths which cause its pressure to drop.

In a preferred embodiment, the recovery circuit comprises, downstream of said chamber, means for suction of said mist. This device makes it possible to cause the cooling air to flow even at low speeds or on the ground, where the pressure in the air intake would be insufficient to ensure this flow.

Advantageously, said suction means is arranged downstream of an oil separator for separating the air and oil forming said mist, such that the suction acts on oil-free air.

This configuration has the advantage of simplicity, as the air removed by suction can then be vented directly to the outside.

Preferably, said suction means is fitted to the oil reservoir. All the functions of oil separation and venting of the pressurization air are then gathered in a single location.

In one particular embodiment, the suction means comprises a jet pump.

Such a device is simple to implement thanks to the free availability of pressurized air which can be bled from the flow of the turbomachine.

Advantageously, the jet pump is supplied with air bled from a stage of a compressor.

In one particular embodiment, the circuit for supplying air to the jet pump comprises a valve for regulating the supply pressure of said jet pump.

This device makes it possible to regulate the level of suction of the jet pump and therefore the pressure drop to which the recovery circuit for the oil-free air is subjected.

Advantageously, said regulating valve is actuated in dependence on the difference in pressure between the interior and the exterior of the oil reservoir. This makes it possible to ensure the integrity of the oil reservoir and to avoid it collapsing under too great a pressure difference.

Preferably, the pressurization system comprises a control module which switches off the suction when the turbomachine exceeds a predefined rotational speed.

As the need for suction appears only at low engine speeds, a module of this type makes it possible to avoid unnecessary bleeding of air when the turbomachine is required to deliver power.

The invention also relates to a turbomachine comprising at least one chamber for lubricating at least one of its bearings, characterized in that it comprises a pressurizing system as described hereinabove for supplying said chamber with pressurized air.

BRIEF DESCRIPTION OF THE SEVERAL VIEWS OF THE DRAWINGS

The invention will be better understood, and other aims, details, features and advantages of the invention will appear more clearly, in the course of the detailed explanatory description which follows, of an embodiment of the invention which is given as a purely illustrative and non-limiting example, with reference to the attached schematic drawings, in which.

DETAILED DESCRIPTION OF THE INVENTION

Figure 1:
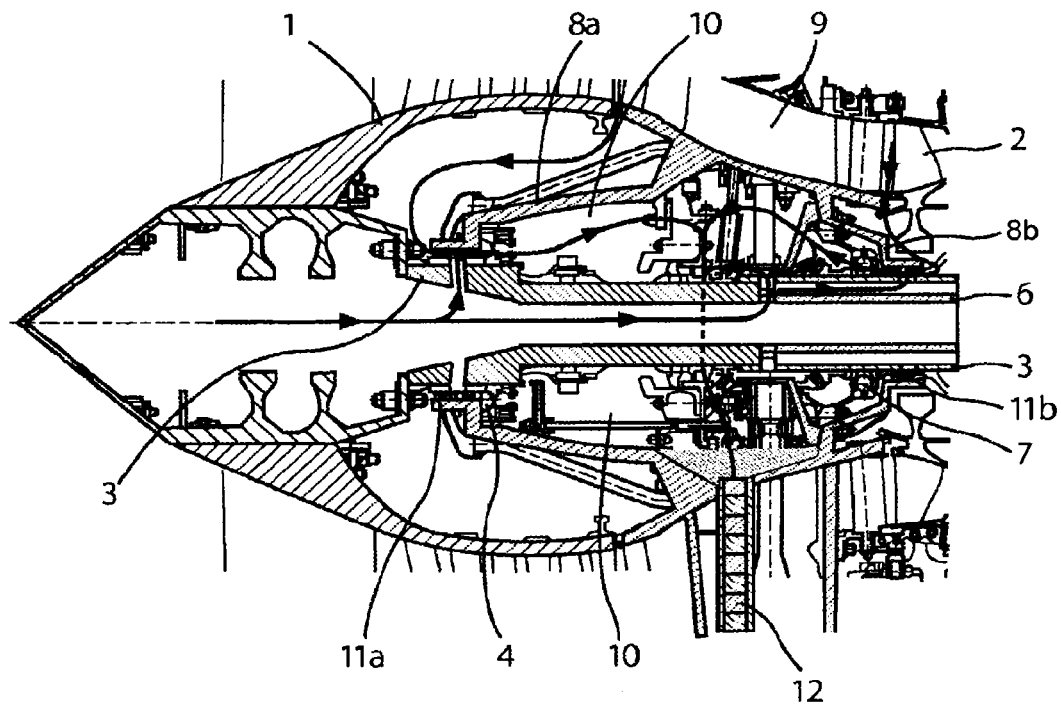
FIG. 1 is a view in section of a turbomachine, at the level of its forward chamber.

FIG. 1 shows the forward portion of a turbomachine comprising a LP compressor 1 and the first stage of a high-pressure (HP) compressor 2. The LP compressor 1 is carried by a low-pressure shaft 3 which rotates on a forward LP bearing 4 fitted with a rolling-contact thrust bearing and on a rear LP bearing 5 (visible in FIG. 2) fitted with a roller bearing. The HP compressor is, for its part, carried by a high-pressure shaft 6 which rotates on a forward HP bearing 7 fitted with a rolling-contact thrust bearing and on a rear HP bearing (not shown). The forward LP and HP bearings are held in place by flanges 8a and 8b of the intermediate frame 9. The flanges 8a and 8b form with the LP shaft 3 a cavity 10, creating the chamber for cooling and lubricating the various bearings of the forward portion of the engine. Sealing between the stationary flanges 8a and 8b and the LP rotor 3 is ensured by labyrinths 11a and 11b which close off the forward chamber 10.

The figure shows the direction of flow of the air for pressurizing the forward chamber 10, with primary bleeding of air through the front cone of the turbomachine, such that the air bled therefrom is at a relatively low temperature as it has not been compressed. This air comes from the air intake duct of the engine and enters the front cone through an orifice (not shown) which may be located either at the tip of the cone or on the surface thereof. It then passes from the front cone to the forward chamber 10 by means of openings made in the high-pressure and low-pressure rotors.

Complementary air is bled from downstream of the LP compressor 1, at the exit from the final stage of this compressor, and at the entrance to the HP compressor 2 in order to ensure adequate flow rate. This air, which enters the forward chamber 10 through the labyrinths 11a and 11b, is returned to a pressure close to that of the air from the cone by means of the efficiency of these labyrinths being regulated. As the air coming from the cone enters the chamber 10 downstream of the labyrinths 11a and 11b, it is possible to ensure that the pressures of these two air inlets are similar, such that the risk of flow reversal is avoided.

When circulating in the chamber 10, the pressurization air becomes laden with oil, and the mist thus formed is recovered in the lower part of the chamber in order to be passed into an oil separator 12 where the air and oil are separated.

Figure 2:
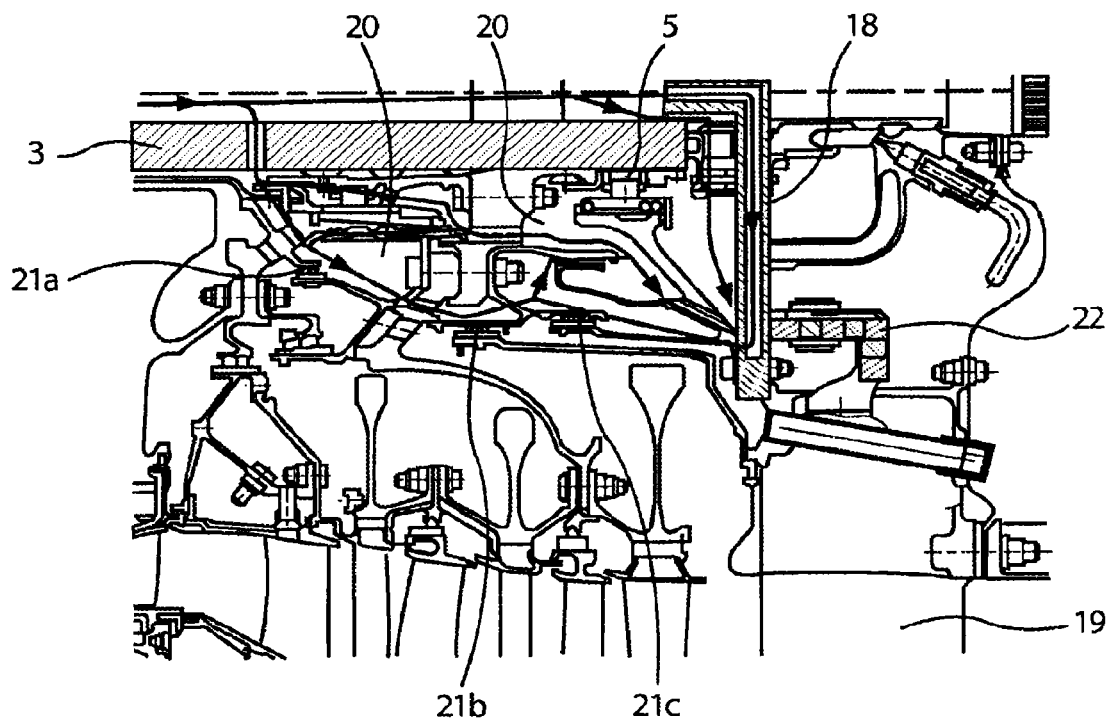
FIG. 2 is a view in section of a turbomachine, at the level of its rear chamber.

Similarly, on the downstream side of the engine as shown in FIG. 2, a rear pressurization chamber 20, which encloses the bearings carrying the rotating shafts 3 and 6, is bounded on one hand by a flange 18 and by stationary partitions carried by the exhaust frame 19 and, on the other hand, by moving partitions connected to the rotating parts. Labyrinths 21a, 21b and 21c provide sealing between the stationary parts and the rotating parts. The pressurization air, coming from the front cone via the interior of the high-pressure and low-pressure rotating shafts, enters the chamber 20 through orifices made for this purpose in the one or more rotating shafts of the engine, where it becomes laden with oil to form a lubricating mist, and exits therefrom through an oil separator 22 which separates the oil from the air and returns the recovered oil to the general oil reservoir for the turbomachine.

Figure 3:
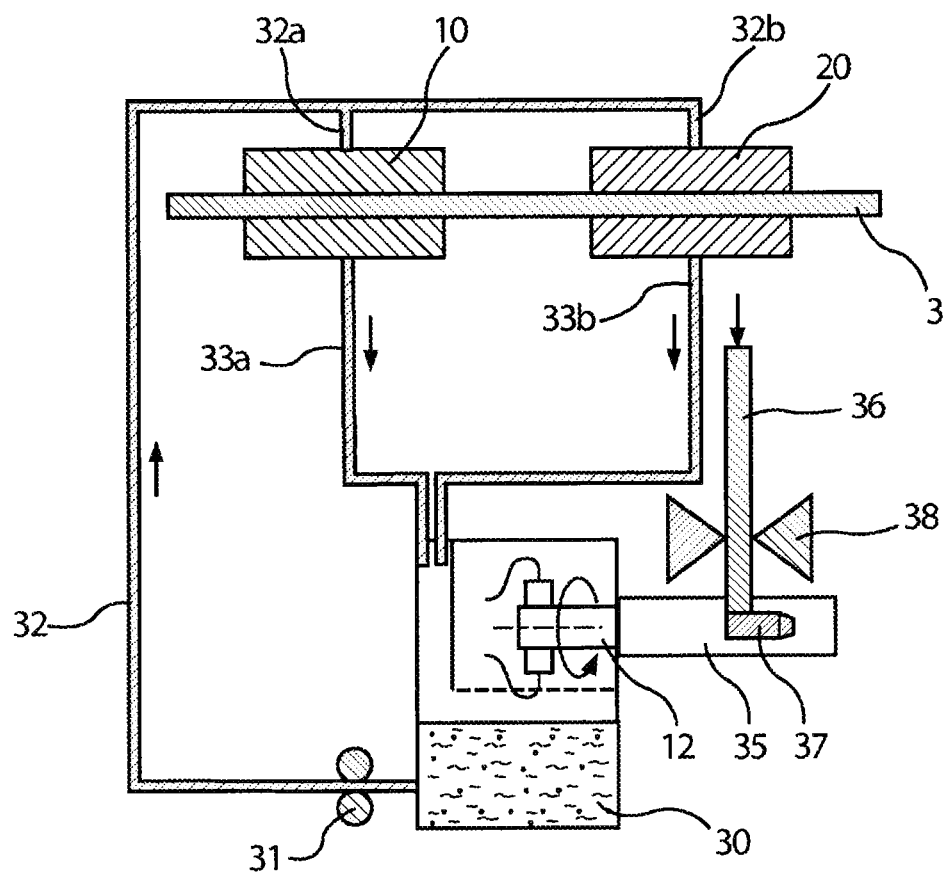
FIG. 3 is a schematic view of a system for lubricating and pressurizing the chambers of a turbomachine, according to one embodiment of the invention.

With reference now to FIG. 3, there follows a description of the diagram of a device for lubricating and pressurizing the forward chamber 10 and rear chamber 20 in one embodiment according to the invention. The oil circuit comprises, in the conventional way, a reservoir 30 containing oil which is held, by means of known heat exchanger systems, at a temperature which is low enough to make cooling of the various bearings of the engine possible. The circuit comprises an oil circulation pump 31 and conduits 32, 32a and 32b for conveying the oil into the forward chamber 10 and rear chamber 20, respectively, where the oil is injected onto the parts to be cooled by means of nozzles (not shown). Recovery conduits, 33a and 33b respectively, recover the oil mist as it leaves the forward chamber 10 and rear chamber 20. The mist recovered from the two chambers empties into the reservoir 30 which comprises an oil separator 12 (in the configuration of FIG. 3, the two oil separators 12 and 22 of FIGS. 1 and 2 are as one).

The oil separator removes the oil from the mist; the oil falls back into the reservoir while the air is expelled from this same reservoir. The expulsion of the air is facilitated by a pressure drop generated by means of a jet pump 35 which works on the principle of a Venturi tube: pressurized air is bled from the exit of a compressor stage by a conduit 36 and is sent through a nozzle 37 to generate a pressure drop at the exit from the oil separator 12. A regulating valve 38 is positioned on the conduit 36 supplying air to the jet pump 35 so as to regulate the pressure drop in the Venturi tube and thus control the pressure difference between the interior and exterior of the oil reservoir, in order to ensure its integrity.

The air used for the operation of the Venturi tube, which flows through the conduit 36, is bled from the exit of a compressor stage so as to have a pressure which is above that of the air from the intake duct. The temperature of this air, which is therefore above that of the pressurization air, has no effect on the cooling of the various bearings as it does not flow through the chambers 10 and 20.

There follows a description of the operation of the circuit for pressurizing the forward and rear chambers by means of a device according to the invention, as represented in FIG. 3.

The air for pressurizing the chambers is bled at a relatively low pressure in order for the temperature of said air not to be too high, because if it were, it would not be able to effectively cool the various bearings of the rear chamber 20. This air becomes laden with oil in the two chambers and the mist thus formed is recovered at the exit by recovery conduits 33a and 33b which convey it into the oil reservoir 30.

The oil separator 12 separates the oil, which falls back into the reservoir 30, from the pressurization air which is removed by suction by the jet pump 35 and expelled outside the engine. Circulation of the pressurization air is thus ensured, both by the pressure generated in the intake duct and by a pressure drop at the exit, generated by the suction of the jet pump 35. It is thus no longer necessary to choose air which has been pressurized by one or more compressor stages—which would cause the temperature of the air entering the chambers to rise above acceptable levels—in order to ensure, under all operating conditions, circulation in the chambers of the air for pressurizing and cooling. The turbomachine designer is therefore free to choose the pressure of the air supplied to the Venturi tube. As the pressurization air is bled at a pressure that is still relatively low, the temperature of this air is not too high, which solves the technical problem addressed by the invention.

In the embodiment represented, the jet pump 35 is attached to the oil reservoir, which offers the advantage of providing suction for the pressurization air downstream of the oil separator, so that the suction acts on oil-free air.

The presence of the regulating valve 38 is intended to regulate the pressure drop generated in the jet pump 35 and, consequently, to control the pressure difference between the interior and the exterior of the oil reservoir. The presence of the valve makes it possible to ensure that the pressure drop generated inside the reservoir by the jet pump will not exceed the structural limits of the reservoir, which will then not collapse under the surrounding pressure.

Finally, a control device can be assigned to this valve, which control device switches the jet pump on or off according to the operating conditions of the turbomachine. As the need to generate suction at the exit of the pressurization circuit arises only when on the ground or at low engine speeds in flight, a suitable control module makes it possible to close the regulating valve 38 once a predetermined engine speed is reached. By closing the air supply conduit 36, air is no longer bled from the compressor, as so-doing becomes irrelevant at high engine speeds precisely at the time when the pilot requires more power from the engine.

The system has been described with a jet pump 35 situated at the exit from the oil separator 12, but it is obvious that this jet pump could be replaced by any device which generates suction of the air at the exit from the forward chamber 10 and rear chamber 20, and which would therefore permit the choice of a less marked overpressure at the entrance to the pressurization circuit.

The invention claimed is:

1. A system for pressurizing at least one chamber for lubricating bearings of a turbomachine, comprising:
   a supply circuit for supplying the chamber with pressurized air; and
   a recovery circuit for recovering an oil mist formed in the chamber and for returning the oil mist recovered by the recovery circuit to an oil reservoir of the turbomachine,
   wherein the supply circuit supplies the chamber with air coming from an air intake duct of the turbomachine, bled upstream from a low-pressure compressor, and
   wherein the air bled from upstream of the low-pressure compressor enters the chamber through an opening provided on a low-pressure shaft of the turbomachine.

2. The pressurizing system as claimed in claim 1, wherein the supply circuit is supplied both with air bled from upstream of the low-pressure compressor and with air bled from downstream of a compressor stage that is air being returned to a pressure of the air bled from upstream of the compressor by being passed through a labyrinth.

3. The pressurizing system as claimed in claim 1, wherein the recovery circuit comprises, downstream of the chamber, means for suction of the oil mist.

4. The pressurizing system as claimed in claim 3, further comprising a control module that switches off the suction means when the turbomachine exceeds a predefined rotational speed.

5. The pressurizing system as claimed in claim 3, wherein the suction means is arranged downstream of an oil separator for separating the air and oil forming the oil mist, such that a suction acts on oil-free air.

6. The pressurizing system as claimed in claim 5, wherein the suction means is fitted to the oil reservoir.

7. The pressurizing system as claimed in claim 3, wherein the suction means comprises a jet pump.

8. The pressurizing system as claimed in claim 7, wherein the jet pump is supplied with air bled from a stage of a compressor.

9. The pressurizing system as claimed in claim 7, wherein a jet pump supply air circuit for supplying air to the jet pump comprises a regulating valve for regulating supply pressure of the jet pump.

10. The pressurizing system as claimed in claim 9, wherein the regulating valve is actuated in dependence on a difference in pressure between an interior and exterior of oil reservoir.

11. The pressurizing system as claimed in claim 1, wherein the air bled upstream from the low-pressure compressor is bled through a front cone of the turbomachine.

12. A turbomachine comprising:
   at least one chamber for lubricating at least one bearing of the turbomachine; and
   a pressurizing system for supplying the chamber with pressurized air, the pressurizing system including
   a supply circuit for supplying the chamber with pressurized air; and
   a recovery circuit for recovering an oil mist formed in the chamber and for returning the oil mist recovered by the recovery circuit to an oil reservoir of the turbomachine,
   wherein the supply circuit supplies the chamber with air coming from an air intake duct of the turbomachine, bled upstream from a low-pressure compressor, and
   wherein the air bled from upstream of the low-pressure compressor enters the chamber through an opening provided on a low-pressure shaft of the turbomachine.

\* \* \* \* \*